May 28, 1963 J. O. HRUBY, JR 3,091,401
SPRINKLING SYSTEM
Filed Feb. 19, 1962
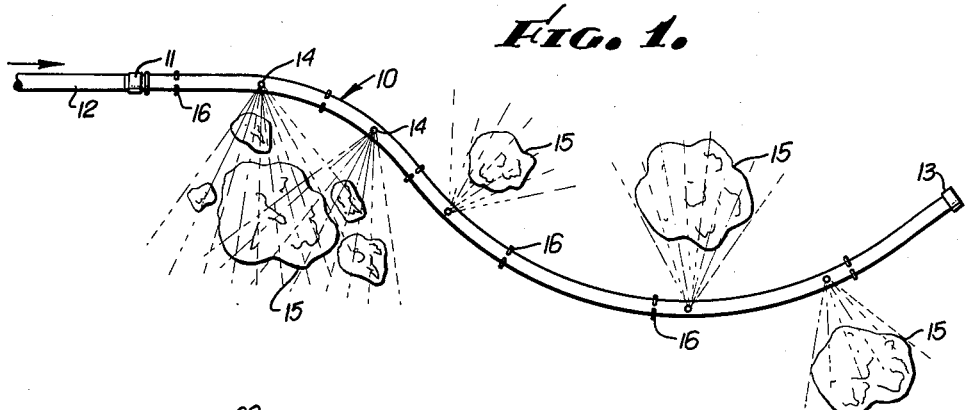
FIG. 1.
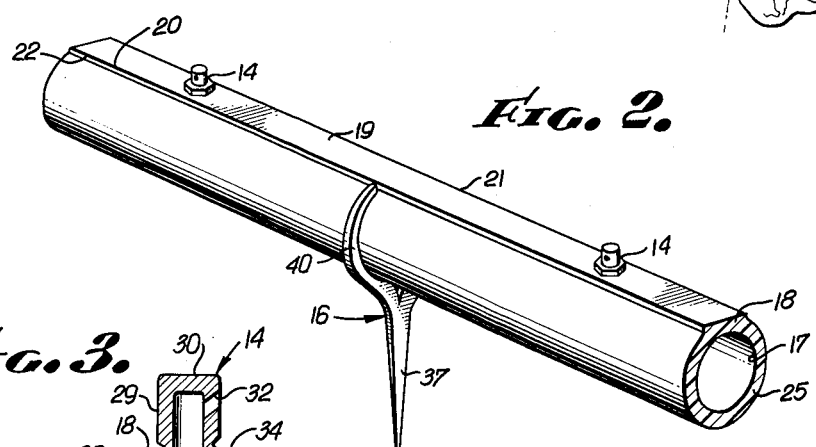
FIG. 2.
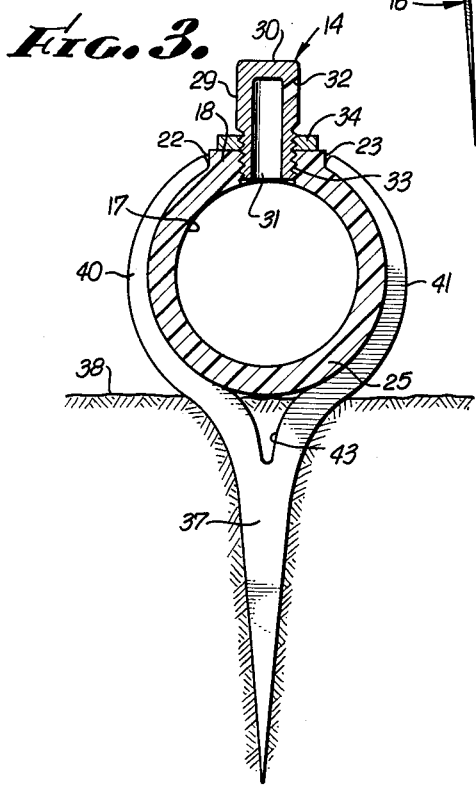
FIG. 3.
FIG. 4.
INVENTOR.
JOHN O. HRUBY, JR.
BY J. M. Dubiel
ATTORNEY.

United States Patent Office 3,091,401
Patented May 28, 1963

3,091,401
SPRINKLING SYSTEM
John O. Hruby, Jr., Burbank, Calif., assignor to Rain Jet Corporation, Burbank, Calif., a corporation of California
Filed Feb. 19, 1962, Ser. No. 173,958
2 Claims. (Cl. 239—276)

This invention relates generally to sprinkling systems and more particularly to a flexible hose for mounting a series of sprinklers spaced apart along the length of the hose.

It is an object of this invention to provide a flexible hose for a water sprinkling system, the hose being adapted to mount a series of upright sprinklers spaced apart along the length of the hose, and the cross-sectional configuration of the hose being such that the hose is adapted to be releasably engaged by supports which anchor the hose to the ground and prevent turning of the hose on its axis.

Further objects and advantages of the invention will appear in the course of the following part of this specification, wherein the details of construction and mode of operation of a preferred embodiment are described with reference to the accompanying drawing, in which:

FIG. 1 is a plan view of a sprinkler system of this invention extending along the ground between shrubs to be watered;

FIG. 2 is a perspective view of a section of the hose of the sprinkler system having two sprinkler elements and a support for anchoring the hose upon the ground;

FIG. 3 is a cross-section on an enlarged scale through the hose and through a sprinkler element and showing the support for the hose in elevation; and, FIG. 4 is a cross-section through the hose alone taken on a plane through a place for attachment of a sprinkler element.

Referring to the drawing in greater detail the hose of the illustrated sprinkler system is designated by reference numeral 10, it having a conventional coupling member 11 at its inlet end for connection to a water supply hose or pipe 12, and it has a conventional plug or cap 13 at its outer end for closing its other end. The hose mounts a plurality of sprinkler elements 14 and extends along the ground between shrubs 15, the hose being anchored upon the ground by a plurality of supports 16.

Hose 10 is formed of elastomer, preferably of plastics, e.g., polyethylene resin. The illustrated hose is circular in cross-section on its inside 17. The hose has a thickened portion 18 throughout its length. Such thickened portion presents a flat surface 19 of substantially uniform width and in a plane perpendicular to a radius of the hose. The two side edges of the flat surface 19 are designated by numerals 20 and 21, respectively. The thickened portion has two side walls or shoulders 22 and 23, which in the illustrated embodiment are substantially normal to the plane of the flat surface 19, they meeting the flat surface along the side edges 20 and 21 respectively. The circular wall portion or segment extending from shoulder to shoulder is designated by numeral 25. In the illustrated embodiment, the flat surface 19 is tangent at its medial line to the projection of the circle of the outside of segment 25 whereby the thickness of the segment 18 along its center line is equal to that of the circular wall segment 25. The circumferential extent of the thickened segment 18 may be defined with relation to the central angle $a$ (FIGURE 4) which subtends the segment. Such central angle is not greater than 90° and preferably about 45°. Angle $a$ should be substantially less than 90° when it is contemplated that the hose be used in an installation of the hose hanging by supports from a ceiling, for example.

The hose has a series of bores 27 centered on and normal to the medial line of the flat surface 19. Each such bore receives a sprinkler element 14. The illustrated sprinkler element 14 comprises a hollow cylindrical body 29 closed at its top 30 and having an inlet opening 31 at its bottom and an outlet orifice 32. The lower end of the sprinkler body 29 is externally screw threaded at 33 whereby the sprinkler element may be secured into a bore 27 of the hose with the screw threads on the sprinkler element cutting complementary threads in the wall of the bore. An annular shoulder around the sprinkler body is provided by the undersurface of a nut 34 which, when turned down on the body, seats upon the flat surface 19 of the hose to hold the sprinkler in a position of its longitudinal axis extending radially of the hose.

The anchoring or support elements 16 are preferably formed of plastics. Each has a pointed stake 37 to be driven into the ground, the ground surface being represented in FIG. 3 by numeral 38. The supports are bifurcated each having two arms 40 and 41 which extend circumferentially of the hose and abut at their ends against the side shoulders 22 and 23 respectively thereby to hold the hose against rotating in the supports. There is a split 43 between the arms where they are integral with the stake portion 37, such split permitting spreading of the arms apart to receive the hose between them.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having thus described the invention what is claimed as new in support of Letters Patent is:

1. A sprinkler system adapted to extend along a mounting surface, and comprising a flexible hose having a thickened portion on its outside extending substantially throughout the length of the hose, the thickened portion having a flat surface of substantially uniform width and being perpendicular to a radius of the hose and having two side shoulders meeting the side edges respectively of said flat surface, the circumferential extent of said thickened portion being less than a quadrant of the circle of the outside of the hose, the hose having a series of openings spaced apart along the medial line of said flat surface and with the axis of each opening being normal to the plane of said flat surface, a longitudinally extending series of sprinklers secured in said openings respectively, each sprinkler having means defining a shoulder seated flush against said flat surface and having an inlet open to the inside of the hose and an outlet disposed outwardly beyond said flat surface, and a longitudinally extending series of hose supports spaced apart along the length of the hose, each support having means for attachment thereof to said mounting surface, two arms extending circumferentially of the hose from said attachment means to abutment against said side shoulders respectively, thereby to prevent rotation of the hose in the supports.

2. A sprinkler system adapted to extend along the ground, and comprising a flexible hose, means for closing one end of the hose, means at the other end for connecting the hose to a water supply pipe, the hose having a thickened portion on its outside extending substantially throughout the length of the hose, the thickened portion having a flat surface of substantially uniform width and being perpendicular to a radius of the hose and having two side shoulders meeting the side edges respectively of said flat surface, the circumferential extent of said thickened portion being not greater than a quadrant of the circumference of the hose, the hose having a series of openings spaced apart along the medial line of said flat surface and with the axis of each opening being normal to the plane of said flat surface, a longitudinally extending series of sprinklers secured in said opening respectively, each sprinkler having an inlet open to the inside of the hose and an outlet disposed outwardly beyond said flat surface, each sprinkler having an outside annular shoulder seated against said flat surface, and a longitudinally extending series of hose supports spaced apart along the length of the hose, each support having a pointed stake for extending into the ground, and two arms of substantially equal length extending circumferentially of the hose from said stake to abutment against said side shoulders respectively.

References Cited in the file of this patent

UNITED STATES PATENTS

| | | |
|---|---|---|
| 2,145,451 | McCoy | Jan. 31, 1939 |
| 2,714,530 | Shepard | Aug. 2, 1955 |
| 2,757,962 | MacLeod | Aug. 7, 1956 |
| 2,954,194 | Alfano | Sept. 27, 1960 |